(12) United States Patent  (10) Patent No.: US 8,210,718 B2
Tsai et al.  (45) Date of Patent: Jul. 3, 2012

(54) LIGHT SOURCE MODULE

(75) Inventors: Cheng-Min Tsai, Hsin-Chu (TW); Wen-Mao Wen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 49 days.

(21) Appl. No.: 12/939,700

(22) Filed: Nov. 4, 2010

(65) Prior Publication Data

US 2011/0103093 A1  May 5, 2011

(30) Foreign Application Priority Data

Nov. 5, 2009 (TW) .............................. 98137616 A

(51) Int. Cl.
F21V 21/00 (2006.01)

(52) U.S. Cl. ......... 362/249.06; 362/249.02; 362/249.08; 362/612; 174/254; 361/749

(58) Field of Classification Search ............. 362/249.02, 362/249.06, 249.08, 612, 613; 174/254, 174/255, 250; 361/749
See application file for complete search history.

(56) References Cited

U.S. PATENT DOCUMENTS

| 6,793,368 | B2 | 9/2004 | Ladstätter | |
| 7,438,437 | B1 | 10/2008 | Chang | |
| 7,478,929 | B2 | 1/2009 | Kim | |
| 7,784,989 | B2 | 8/2010 | Shin | |
| 8,047,668 | B2 * | 11/2011 | Chang et al. | 362/97.1 |
| 2006/0221638 | A1 * | 10/2006 | Chew et al. | 362/613 |
| 2007/0133222 | A1 | 6/2007 | Watanabe et al. | |
| 2010/0008090 | A1 * | 1/2010 | Li et al. | 362/249.03 |
| 2010/0220046 | A1 * | 9/2010 | Plotz et al. | 345/102 |
| 2010/0328947 | A1 * | 12/2010 | Chang et al. | 362/249.02 |

FOREIGN PATENT DOCUMENTS

| CN | 2784972 Y | 5/2006 |
| JP | 2005-078917 | 3/2005 |
| TW | 200821694 | 5/2008 |
| TW | M345925 U | 12/2008 |

* cited by examiner

*Primary Examiner* — Ali Alavi

(74) *Attorney, Agent, or Firm* — Muncy, Geissler, Olds & Lowe, PLLC

(57) ABSTRACT

A light source module includes a light bar and a stiffened bar. The light bar includes a flexible circuit strip and a plurality of light sources. The light sources are disposed on the flexible circuit strip along an extension direction of the flexible circuit strip. The stiffened bar overlaps the flexible circuit strip and is disposed on a face of the flexible circuit strip having the light sources. The stiffened bar surrounds at least one side of each light source and exposes the light sources. The rigidity of the stiffened bar is larger than the flexible circuit strip.

21 Claims, 5 Drawing Sheets

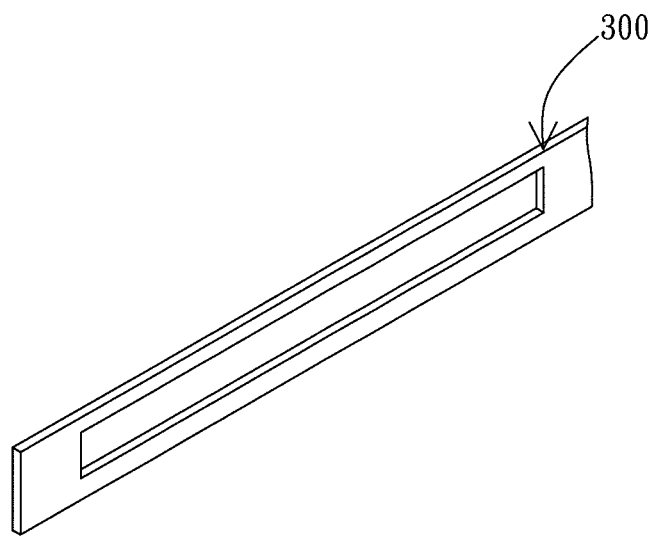
FIG. 5
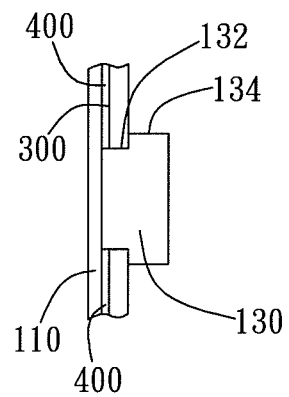 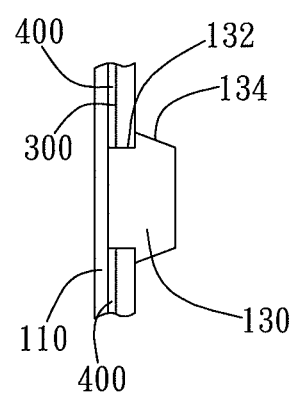
FIG. 6  FIG. 7

LIGHT SOURCE MODULE

BACKGROUND OF THE INVENTION

1. Field of the Invention

The present invention relates generally to a light source module; particularly, the present invention relates to a light source module used in a backlight module of a liquid crystal display (LCD).

2. Description of the Prior Art

Liquid crystal display (LCD) has been extensively applied in a variety of electronic products, such as computer, TV, and mobile phone. Backlight module is one of important components of the LCD. The light source used in the backlight module directly affects performance of the backlight module and the assembly cost. Light emitting diodes (LED) become one of the light sources used in LCD as a result of its small volume and low power consumption. Besides, compared to the bottom lighting backlight module, the edge lighting backlight module gets more attention because of its thinner thickness.

The common structure of the edge lighting backlight module includes a light source device, a light guide plate, and a supporting stand. The light source device is composed of LED light sources disposed on a flexible circuit strip. The supporting stand has a top plate and a bottom plate extending in the same direction from an upper end and a lower end of the supporting side wall to enclose a semi-open containing space. The light guide plate is placed between ends of the top plate and the bottom plate, the light entry end of the light guide plate is disposed in the containing space with the light source device and corresponds to the light source device. Because the distance between the top plate and the bottom plate is generally smaller than the height of the light source device, the mounting of the light source device has to be from the side of the supporting stand to the containing space. Moreover, since the flexible circuit strip is used in the light source device and a weak rigidity of the flexible circuit strip is exhibited, the light source device cannot easily enter the containing space and be fixed on the supporting side wall. Therefore the design of the light source device mentioned above can be improved.

SUMMARY OF THE INVENTION

It is an object of the present invention to provide a light source module having enhanced rigidity.

It is another object of the present invention to provide a backlight module which can be assembled easily and has an improved yield.

The light source module of the present invention includes a light bar and a stiffened bar. The light bar includes a flexible circuit strip and a plurality of light sources. The plurality of light sources are disposed on the flexible circuit strip along the extension direction of the flexible circuit strip. The stiffened bar overlaps the flexible circuit strip on a face of the flexible circuit strip where the light sources are disposed and extends along the extension direction of the flexible circuit strip, the stiffened bar surrounds at least one side of each light source and exposes the plurality of light sources. The rigidity of the stiffened bar is greater than that of the flexible circuit strip.

The light source includes a top-emission light emitting diode (LED), which includes an illumination surface parallel to the face of the flexible circuit strip where the light sources are disposed. The stiffened bar includes an extension body and a plurality of protrusions. The extension body extends along the extension direction of the flexible circuit strip and is disposed on the same side with plurality of the light sources. The plurality of protrusions respectively extend from the extension body along a shorter side of the flexible circuit strip, wherein each protrusion extends between adjacent light sources.

In another embodiment, the stiffened bar is arranged as an alternatively reversed saw-tooth structure and encloses a plurality of surrounding regions with opening, the plurality of light sources are respectively contained in the plurality of surrounding regions. Adjacent surrounding regions have openings facing opposite directions. In another embodiment, a plurality of through holes are formed on the stiffened bar, wherein the plurality of light sources respectively protrude through the plurality of the through holes. In a further embodiment, the stiffened bar is a rectangular frame enclosing a through hole, the rectangular frame surrounds the plurality of the light sources and the plurality of light sources protrude through the through hole.

The stiffened bar is attached to the flexible circuit strip by an adhesive layer. At least one side of the light source corresponds to the stiffened bar, a groove is formed on the side of the light source, and the stiffened bar extends into the groove. The top end of the side of the light source is inclined to form a guiding ramp.

One side of the frame of the backlight module is formed as a stiffened bar. The backlight module further includes a light guide plate and a supporting stand. The light guide plate is disposed within the frame, the light guide plate have a light entry end extending along the flexible circuit strip, and the light sources emit light toward the light entry end. The supporting stand includes a supporting side wall, a top plate, and a bottom plate. The top plate and the bottom plate extend respectively in the same direction from an upper end and a lower end of the supporting side wall to enclose a semi-open containing space. The light bar and the stiffened bar are disposed in the containing space, and the light guide plate is placed between ends of the top plate and the bottom plate to correspond to the light sources.

The light sources include a top-emission LED. The top-emission LED includes an illumination surface parallel to the face of the flexible circuit strip having the light sources and toward to the light entry end of the light guide plate.

BRIEF DESCRIPTION OF THE DRAWINGS

FIGS. 4 and 5 are perspective views of different embodiments of the stiffened bar.

FIG. 6 is a side view of the embodiment of the present invention.

FIG. 7 is a side view of the embodiment of the guiding ramp disposed at the top end of the side of the light source of the present invention.

DETAILED DESCRIPTION OF THE PREFERRED EMBODIMENT

Figure 1:
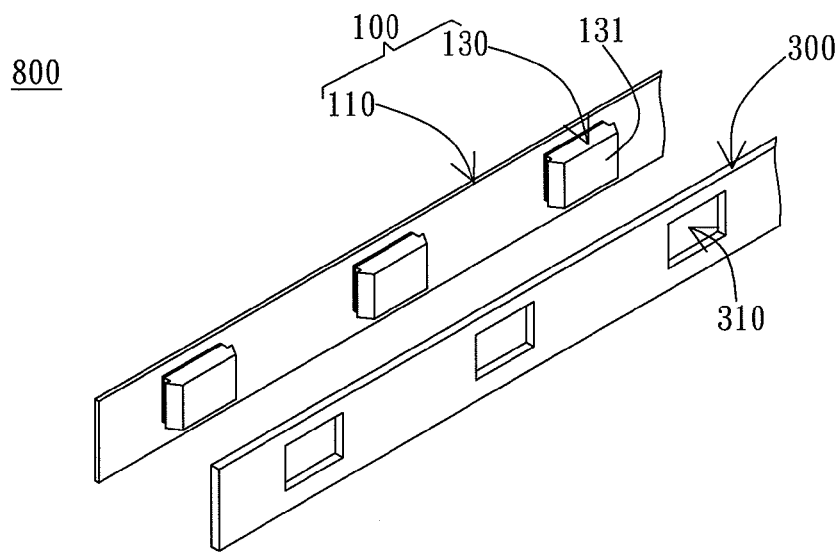
FIG. 1 is an exploded view of the embodiment of the light source module of the present invention.

FIG. 1 is an exploded view of the light source module 800 of the present invention, the light source module 800 of the present invention includes a light bar 100 and a stiffened bar 300. The light bar 100 includes a flexible circuit strip 110 and a plurality of light sources 130. The plurality of light sources 130 are disposed on the flexible circuit strip 110 along an extension direction of the flexible circuit strip 110. In this embodiment, particularly, the flexible circuit strip 110 extends horizontally and the plurality of light sources 130 are equidistantly disposed on a face of the flexible circuit strip 110 along the extension direction of the flexible circuit strip 110. In another embodiment, however, the distance between adjacent light sources can be different.

The stiffened bar 300 overlaps the flexible circuit strip 110 on the face of the flexible circuit strip 110 where the light sources 130 are disposed, and extends along the extension direction of the flexible circuit strip 110. The stiffened bar 300 routes around at least one side of each light source 130 and exposes the plurality of light sources 130. That is, the stiffened bar 300 can surround the periphery of the light source 130 or selectively pass at least one side of the light source 130. The rigidity of the stiffened bar 300 is greater than that of the flexible circuit strip 110. The material of the stiffened bar 300 is preferably a polymer material to provide a certain rigidity. In another embodiment, the material of the stiffened bar 300 can be a high refractive material, which is able to improve the light use efficiency by reflecting the light emitted from the light sources 130. The rigidity of the flexible circuit strip 110 can be improved by attaching the stiffened bar 300 of greater rigidity. There to particularly, when applying a force to the flexible circuit strip 110 in the process of assembling the backlight module, as a result of the single continuous structure of the stiffened bar 300, the force can be exerted on the stiffened bar 300 to make the flexible circuit strip 110 be inserted into a containing space and be fixed to a supporting side wall.

Figure 2:
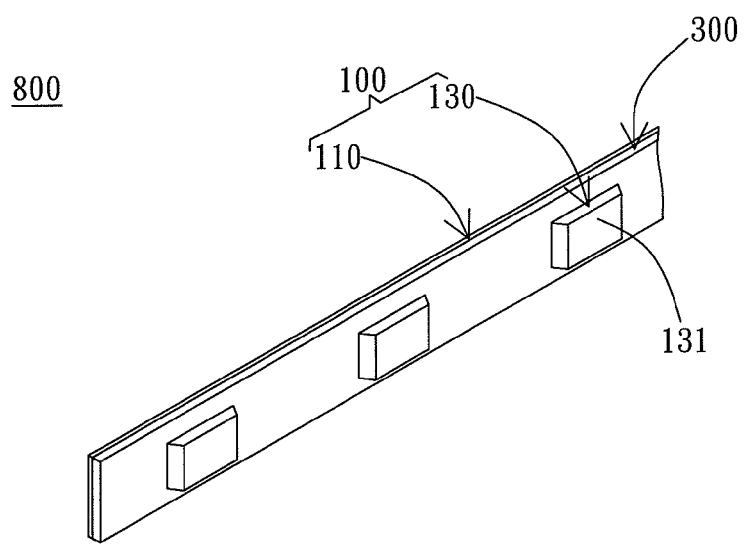
FIG. 2 is a perspective view of the embodiment of the present invention.

The stiffened bar 300 can be arranged in various ways and around at least one side of each light source 130 and exposes the plurality of light sources 130. As the embodiment shown in FIG. 1, a plurality of through holes 310 are formed on the stiffened bar 300, wherein the plurality of light sources 130 respectively protrude through the plurality of through holes 310. In a preferred embodiment, the light source 130 includes a top-emission light emitting diode (LED), and the top-emission LED includes an illumination surface 131. The illumination surface 131 is parallel to the face of the flexible circuit strip 110 where the light sources 130 are disposed. In other words, as FIG. 2 shows, after assembling the light bar 100 and the stiffened bar 300, the light sources 130 will protrude through the through holes 310 with the illumination surface 131 exposed beyond the stiffened bar 300 and parallel to the flexible circuit strip 110. By this way, it can be ensured that the light sources 130 will emit successfully the light while the rigidity of the flexible circuit strip 110 is improved by the stiffened bar 300 at the same time.

Figure 3:
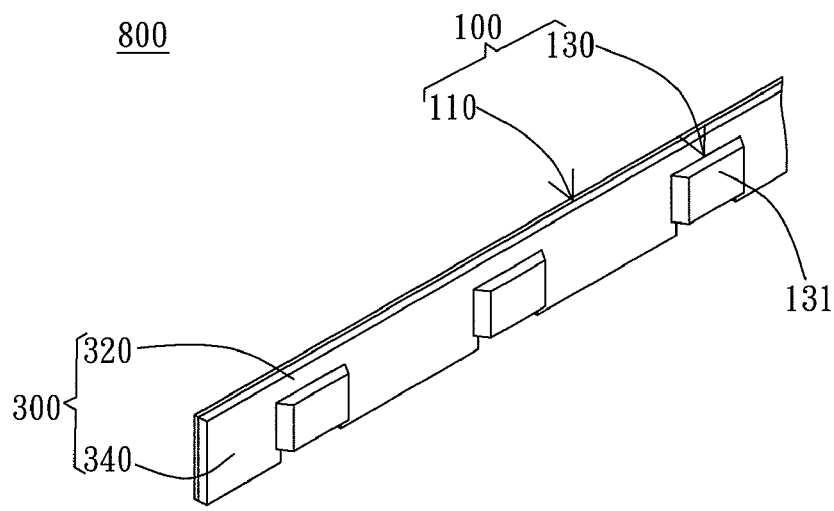
FIG. 3 is a perspective view of another embodiment of the present invention.

In another embodiment shown in FIG. 3, the stiffened bar 300 includes an extension body 320 and a plurality of protrusions 340. The extension body 320 extends along the extension direction of the flexible circuit strip 110 and is disposed on the same side with the plurality of light sources 130. The plurality of protrusions 340 extend respectively from the extension body 320 along a shorter side of the flexible circuit strip 300, wherein each protrusion 340 extends between adjacent light sources 130. Particularly, each light source 130 has three sides surrounded by the stiffened bar 300. The stiffened bar 300 can be regarded as the framework of the flexible circuit strip 110 to improve rigidity of flexible circuit strip 110.

The force can be exerted on the extension body 320 when it is applied to the flexible circuit strip 110.

Figure 4:
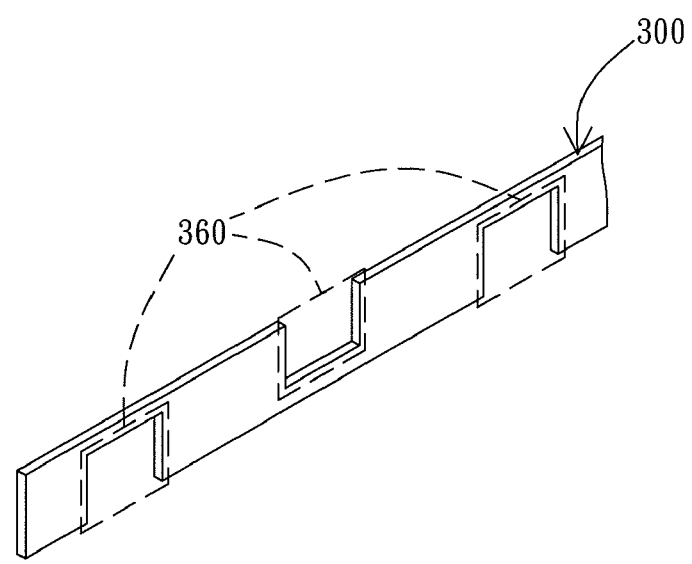

In a different embodiment shown in FIG. 4, the stiffened bar 300 is arranged as alternately reversed saw-tooth and encloses a plurality of surrounding regions 360 with opening, the plurality of light sources 130 (refer to FIG. 3) are respectively contained in the plurality of surrounding regions 360. Adjacent surrounding regions 360 have openings facing opposite directions. In other words, the stiffened bar 300 is arranged to have a cyclicbending structure. The light source 130 is disposed within the recessed bend region of cyclicbending structure. Similarly, the stiffened bar 300 can be regarded as the framework of the flexible circuit strip 110 to improve rigidity of flexible circuit strip 110.

In another embodiment shown in FIG. 5, the stiffened bar 300 is a rectangular frame enclosing a through hole 310, the rectangular frame surrounds the plurality of light sources (not shown in FIG. 5) and all light sources 130 protrude through the through hole 310. In other words, the plurality of light sources are disposed within the through hole 310 of the rectangular frame together. When the force is applied to the flexible circuit strip 110, it can be exerted on the rectangular frame-like stiffened bar 300.

The stiffened bar 300 is attached to the flexible circuit strip 110 by an adhesive layer 400. Before the light bar 100 and the stiffened bar 300 are assembled together, the adhesive layer 400 can be coated on both or one of the opposite faces of the stiffened bar 300 and the flexible circuit strip 110. As the side view of the embodiment of FIG. 6 shows, at least one side 134 of the light source 130 corresponds to the stiffened bar 300, wherein a groove 132 is formed on the bottom of the side 134, and the stiffened bar 300 extends into the groove 132. In a preferred embodiment, the top end of the side 134 is further inclined to form a guiding ramp. In other words, when assembling the light bar 100 and the stiffened bar 300, the guiding ramp at the top end of the side 134 can guide the stiffened bar 300 to the bottom of the light source 130 and then extend into the groove 132. By this way, the assembly process of the light bar 100 and the stiffened bar 300 is easier and the connection between the light bar 100 and the stiffened bar 300 is improved.

Figure 8:
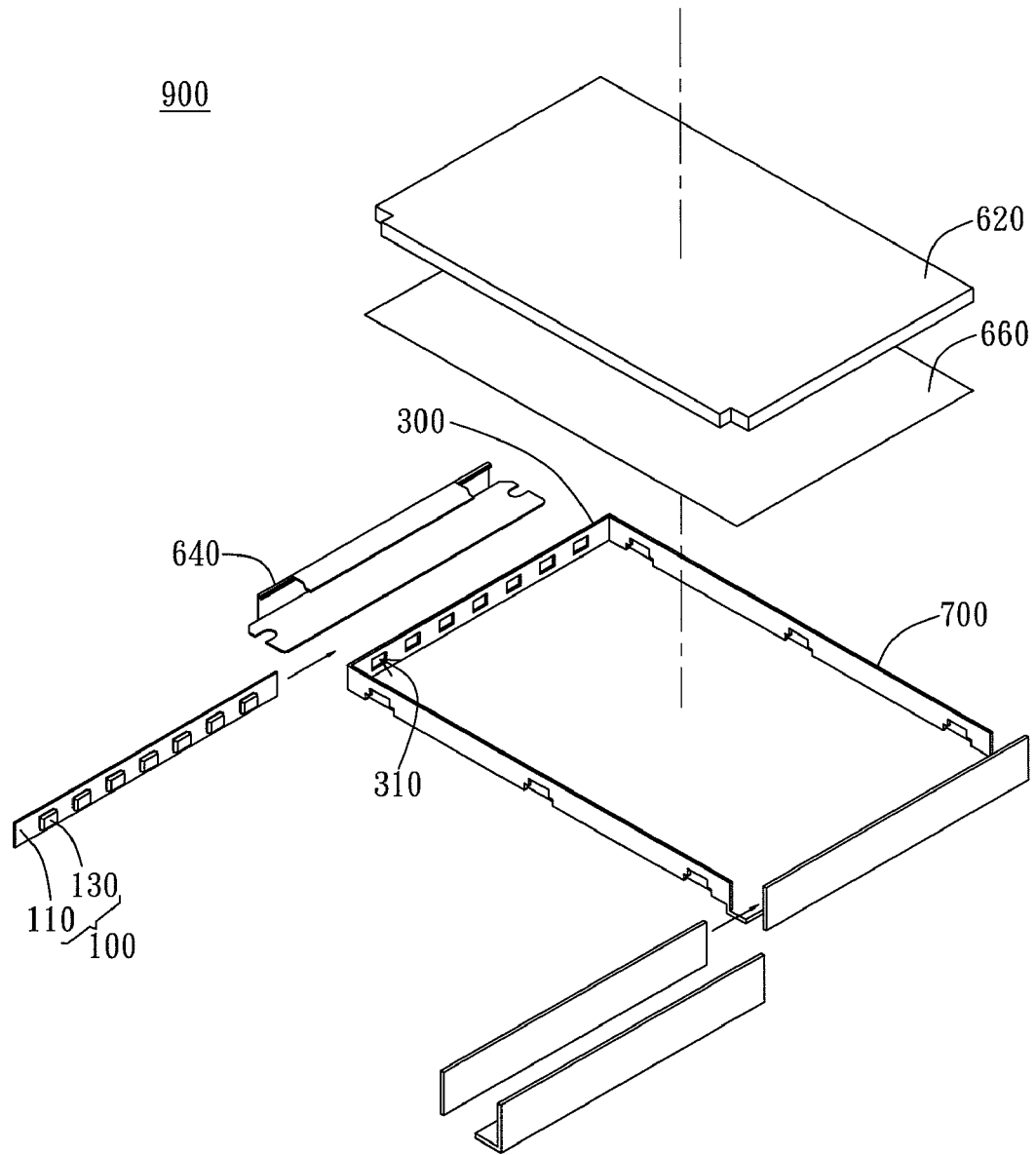
FIG. 8 is a schematic view of the preferred embodiment of the present invention.

As the preferred embodiment shown in FIG. 8, one side of a frame 700 of a backlight module 900 is formed as a stiffened bar 300. Particularly, in the preferred embodiment, a plurality of through holes are formed on the side of the frame 700 of the backlight module 900, wherein the plurality of the light sources 130 respectively protrude through the through holes 310. In another embodiment, one side of the frame 700 of the backlight module 900 can be formed as a structure of a plurality of protrusions (refer to FIG. 3), alternately reversed saw-tooth (refer to FIG. 4), or a rectangular frame-like through hole (refer to FIG. 5) as mentioned above.

Figure 9:
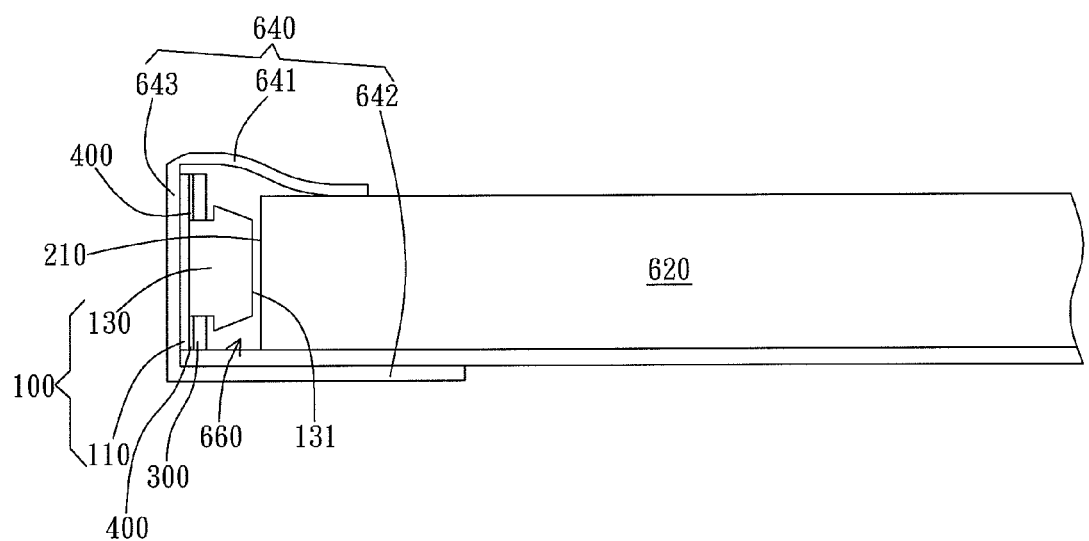
FIG. 9 is a side view of the preferred embodiment of the present invention.

As the side view of the preferred embodiment shown in FIG. 9, the backlight module 900 further includes a light guide plate 620 and a supporting stand 640. The light guide plate 620 is disposed within the frame 700 (refer to FIG. 8), the light guide plate 620 has a light entry end 621 extending along the flexible circuit strip 110. The illumination surface 131 of the light source 130 emits light toward the light entry end 621. The supporting stand 640 includes a supporting side wall 643, a top plate 641, and a bottom plate 642. The top plate 641 and the bottom plate 642 extend in the same direction from an upper end and a lower end of the supporting side wall 643 to enclose a semi-open containing space 660. The light bar 100 and the stiffened bar 300 are disposed in the containing space 660, and the light guide plate 620 is placed between ends of the top plate 641 and the bottom plate 642 to correspond to the light sources 130.

Although the preferred embodiments of present invention have been described herein, a variety of addition, modification, and replacement based upon the preferred embodiment will not be beyond the scope of the present invention as defined by the appended claims. Further modification of style, structure, arrangement, proportion, material, components, and module of the present invention will occur to those skilled in the respective arts. Therefore, the embodiments disclosed here are merely illustrative and will not limit the scope of the present invention. The scope of the present invention is defined by the appended claims, involves legal equivalents, and is not limited to the description above.

What is claimed is:

1. A light source module for a backlight module, comprising:
   a light bar, including:
      a flexible circuit strip; and
      a plurality of light sources, disposed on the flexible circuit strip along an extension direction of the flexible circuit strip; and
   a stiffened bar overlapping the flexible circuit strip on a face of the flexible circuit strip having the light sources, surrounding at least one side of each light source, and exposing the plurality of light sources,
   wherein the rigidity of stiffened bar is greater than that of the flexible circuit strip.

2. The light source module of claim 1, wherein the light source includes a top-emission light emitting diode (LED), the top-emission light emitting diode (LED) includes an illumination surface parallel to the face of the flexible circuit strip having the light sources.

3. The light source module of claim 1, wherein the stiffened bar includes:
   an extension body, extending along the extension direction of the flexible circuit strip and being disposed on the same side with the plurality of light sources; and
   a plurality of protrusions, respectively extending from the extension body along a shorter side of the flexible circuit strip, wherein each protrusion extends between adjacent light sources.

4. The light source module of claim 1, wherein the stiffened bar is arranged as an alternately reversed saw-tooth structure and encloses a plurality of surrounding regions with openings, the plurality of light sources are respectively contained in the plurality of surrounding regions; wherein adjacent surrounding regions have openings facing opposite directions.

5. The light source module of claim 1, wherein a plurality of through holes are formed on the stiffened bar, the plurality of light sources respectively protrude through the plurality of through holes.

6. The light source module of claim 1, wherein the stiffened bar is a rectangular frame enclosing a through hole, the rectangular frame surrounds the plurality of light sources and the plurality of light sources protrude through the through hole.

7. The light source module of claim 1, wherein the stiffened bar is attached to the flexible circuit strip by an adhesive layer.

8. The light source module of claim 1, wherein at least one side of the light source corresponds to the stiffened bar, a groove is formed on a bottom of the side of the light source, and the stiffened bar extends into the groove.

9. The light source module of claim 8, wherein the top end of the side of the light source is inclined to form a guiding ramp.

10. The light source module of claim 1, wherein a material of the stiffened bar includes a high refractive material.

11. A backlight module, comprising:
   a light bar, including:
      a flexible circuit strip; and
      a plurality of light sources, disposed on the flexible circuit strip along an extension direction of the flexible circuit strip; and
   a frame, wherein one side of the frame is formed as a stiffened bar overlapping the flexible circuit strip on a face of the flexible circuit strip having the light sources, surrounding at least one side of each light source and exposing the plurality of light sources,
   wherein the rigidity of stiffened bar is greater than that of the flexible circuit strip.

12. The backlight module of claim 11, further comprising:
   a light guide plate, disposed within the frame, having a light entry end extending along the flexible circuit strip, the light sources emitting light toward the light entry end; and
   a supporting stand, including a supporting side wall, a top plate, and a bottom plate; wherein the top plate and the bottom plate extend in the same direction respectively from an upper end and a lower end of the supporting side wall to enclose a semi-open containing space, wherein the light bar and the stiffened bar are disposed in the containing space, the light guide plate is placed between ends of the top plate and bottom plate to correspond to the light sources.

13. The backlight module of claim 12, wherein the light source includes a top-emission light emitting diode (LED), the top-emission LED includes an illumination surface parallel to the face of the flexible circuit strip having the light sources and toward the light entry end.

14. The backlight module of claim 11, wherein the stiffened bar includes:
   an extension body, extending along the extension direction of the flexible circuit strip and being disposed on the same side with the plurality of light sources; and
   a plurality of protrusions respectively extending from the extension body along a shorter side of the flexible circuit strip, wherein each protrusion extends between adjacent light sources.

15. The backlight module of claim 11, wherein the stiffened bar is arranged as an alternately reversed saw-tooth structure and encloses a plurality of surrounding regions with openings, the plurality of light sources are respectively contained in the plurality of surrounding regions; wherein adjacent surrounding regions have openings facing opposite directions.

16. The backlight module of claim 11, wherein a plurality of through holes are formed on the stiffened bar, the plurality of light sources respectively protrude through the plurality of through holes.

17. The backlight module of claim 11, wherein the stiffened bar is a rectangular frame enclosing a through hole, the rectangular frame surrounds the plurality of light sources and the plurality of light sources protrude through the through hole.

18. The backlight module of claim 11, wherein the stiffened bar is attached to the flexible circuit strip by an adhesive layer.

19. The backlight module of claim 11, wherein a material of the stiffened bar includes a high refractive material.

20. The backlight module of claim 11, wherein at least one side of the light source corresponds to the stiffened bar, a groove is formed on a bottom of the side of the light source, and the stiffened bar extends into the groove.

21. The backlight module of claim 20, wherein the top end of the side of the light source is inclined to form a guiding ramp.

* * * * *